US008452966B1

(12) United States Patent
Petersen et al.

(10) Patent No.: US 8,452,966 B1
(45) Date of Patent: May 28, 2013

(54) METHODS AND APPARATUS FOR VERIFYING A PURPORTED USER IDENTITY

(75) Inventors: Scott E. Petersen, Morgan Hill, CA (US); William Le, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1043 days.

(21) Appl. No.: 11/258,744

(22) Filed: Oct. 26, 2005

(51) Int. Cl.
*G06F 21/00* (2006.01)

(52) U.S. Cl.
USPC ........... 713/176; 713/168; 713/177; 713/178; 713/179; 713/180

(58) Field of Classification Search
USPC    713/170, 201, 168, 176–180; 705/75; 707/10
See application file for complete search history.

(56) References Cited

U.S. PATENT DOCUMENTS

| | | | |
|---|---|---|---|
| 6,145,079 A * | 11/2000 | Mitty et al. | 713/170 |
| 6,161,181 A * | 12/2000 | Haynes et al. | 713/170 |
| 6,182,219 B1 * | 1/2001 | Feldbau et al. | 713/176 |
| 6,199,052 B1 * | 3/2001 | Mitty et al. | 705/75 |
| 6,675,201 B1 * | 1/2004 | Parkkinen | 709/216 |
| 6,820,199 B2 * | 11/2004 | Wheeler et al. | 713/170 |
| 6,834,110 B1 * | 12/2004 | Marconcini et al. | 380/239 |
| 6,880,079 B2 * | 4/2005 | Kefford et al. | 713/155 |
| 6,965,926 B1 * | 11/2005 | Shapiro et al. | 709/219 |
| 6,968,362 B2 * | 11/2005 | Koch et al. | 709/206 |
| 7,131,176 B2 * | 11/2006 | Eggum | 29/436 |
| 7,328,351 B2 * | 2/2008 | Yokota et al. | 713/189 |
| 2002/0042884 A1 * | 4/2002 | Wu et al. | 713/201 |
| 2003/0009694 A1 * | 1/2003 | Wenocur et al. | 713/201 |
| 2003/0135464 A1 * | 7/2003 | Mourad et al. | 705/50 |
| 2006/0161554 A1 * | 7/2006 | Lucovsky et al. | 707/10 |

* cited by examiner

*Primary Examiner* — Philip Chea
*Assistant Examiner* — Ghazal Shehni
(74) *Attorney, Agent, or Firm* — Kilpatrick Townsend & Stockton LLP

(57) ABSTRACT

A system verifies an identity of a content sender by receiving content purporting to originate from a content sender, and performing a validation of the content to determine a purported identity of the content sender. The system prepares and transfers verification data to an address associated with the purported identity of the content sender. In response to transferring the verification data, the system receives a verification response to the verification data, and performs a validation of the verification response to verify the purported identity of the content sender.

22 Claims, 5 Drawing Sheets

214 PREPARE AND TRANSFER VERIFICATION DATA TO AN ADDRESS ASSOCIATED WITH THE PURPORTED IDENTITY OF THE CONTENT SENDER

215 CREATE VERIFICATION DATA TO VALIDATE THE PURPORTED IDENTITY OF THE CONTENT SENDER

216 CREATE SUBSTANTIALLY NON-REOCCURRING THAT IS AT LEAST ONE OF :
I) A NONCE
II) A TIMESTAMP
III) A GLOBALLY UNIQUE IDENTIFIER (GUID)

217 CREATE A SIGNATURE REQUEST CONTAINING THE VERIFICATION DATA AND CONTAINING A REQUEST TO SIGN THE VERIFICATION DATA

218 TRANSMIT THE SIGNATURE REQUEST TO THE ADDRESS ASSOCIATED WITH THE PURPORTED IDENTITY OF THE CONTENT SENDER

219 TRANSMIT THE SIGNATURE REQUEST TO THE EMAIL ADDRESS ASSOCIATED WITH THE PURPORTED IDENTITY OF THE CONTENT SENDER

*FIG. 4*

220 PERFORM A VALIDATION OF THE VERIFICATION RESPONSE TO VERIFY THE PURPORTED IDENTITY OF THE CONTENT SENDER

221 VERIFY THAT THE VERIFICATION RESPONSE WAS RETURNED FROM AN EMAIL ADDRESS TO WHICH THE VERIFICATION DATA WAS SENT

OR

222 VERIFY THAT THE VERIFICATION RESPONSE WAS RETURNED FROM AN EMAIL ADDRESS TO WHICH THE VERIFICATION DATA WAS SENT2

223 VERIFY THAT A SIGNATURE ON THE VERIFICATION DATA CONTAINED IN THE SIGNATURE REQUEST IS THE SAME AS SIGNATURE VERIFIED AGAINST THE CERTIFICATE

FIG. 5

METHODS AND APPARATUS FOR VERIFYING A PURPORTED USER IDENTITY

BACKGROUND

Conventional technologies for public key infrastructure (PKI) allow users to exchange information in an encrypted form over an unsecured network through the use of a public and a private cryptographic key pair that is obtained through a trusted authority. A public key is a value provided by some designated authority as an encryption key that, when combined with a private key derived from the public key, can be used to effectively encrypt messages and digital signatures. Public key are shared between users. Typically, an encrypted message will be sent from a sender to a receiver using the receiver's public key to encrypt the message. If encrypted with a receiving user's shared public key, the message can only be decrypted with a combination of the receiving user's public and private keys. An encrypted signature can be sent from a sender to a receiver using the sender's private key to encrypt the signature. The signature can be verified on the receiving side using the sending users public key.

A digital signature is an electronic signature that can be used to authenticate the identity of the sender of a message or the signer of a document. This is based on the principles that only the signor had access to the private key and thus the signature must be authentic if it verifies correctly using that sender's public key. A digital signature can be generated on some original content and a recipient can use the signature to validate that the original content of the message or document that has been sent has not been modified. Digital signatures (such as XML digital signature recommended by W3C) are easily transportable, cannot be duplicated, and can be automatically time-stamped. A digital signature can be used with any kind of message, whether the message is encrypted or not, simply so that the receiver can be sure of the sender's identity, and that the message arrived intact.

XML digital signatures provide integrity, message authentication, and signer authentication services. Digital signatures are created and verified using cryptography. Digital signatures are created by performing an operation on information. Those that receive content containing an XML digital signature can confirm both the identity of the signer, and the trustworthiness of the information.

A digital certificate is an electronic identifier that establishes credentials when conducting transactions over a network. A certification authority issues a digital certificate. A digital certificate contains information related to the certificate holder such as that holder's identity and electronic communication, a copy of the certificate holder's public key (used for encrypting messages and digital signatures), and the digital signature of the certificate-issuing authority so that a recipient can verify that the certificate is real. Digital certificates can be kept in registries so that authenticating users can look up other users' public keys.

SUMMARY

Conventional technologies for public key infrastructure (PKI) suffer from a variety of deficiencies. In particular, conventional security technologies are difficult and cumbersome to implement due to requirements for access to the security infrastructure. As an example, such conventional security technologies require that a receiving party (of digitally signed content) have access to a public key infrastructure (PKI) implementation of a certificate authority to be able of authenticate the received digitally signed content, and also to encrypt and decrypt both messages and digital signatures. If a message is received containing, for example a signed certificate from a sending party, a receiving party without access to the proper certificate authority will not be able to verify the authenticity of the message using the signed certificate.

Embodiments disclosed herein significantly overcome such deficiencies and provide a system that allows a user without access to public key infrastructure to perform a validation process on content that purports to originate from a specific user. As an example, if a first user receives an email message containing a signed message (and a certificate to verify that signature) that purports to originate from some other user, the system disclosed herein allows the first user to obtain the purported identity and address, such as an electronic communication, of the other user (e.g., as listed within a certificate in the content). Since the certificate within the content may or may not have truly been generated by the purported identity of the other user, the first user may not be certain that content is really content from that user. As an example, even though the content contains a certificate from a user indicated as John Smith with an electronic communication of John.Smith@example.org, the first user receiving this certificate cannot be certain that a malicious other user did not generate this certificate purporting to be John Smith. To perform a verification of this identity, the system disclosed herein generates signed content from the first user that is then transmitted to the address of the purported identity of the originator of the content (i.e. sent to John.Smith@example.org). In an example configuration, a user initiates the sending of the signed content to the purported originator of the content only if the first user knows both the purported originator of the content, and the address of the purported originator of the content since some malicious content purports to be from an originator of content, but the address is slightly different (i.e. one character off from the actual address of the purported originator of the content). The signed content contains verification data, such as a nonce along with a request that a recipient of the verification data return a signed copy of the verification data in the verification response. The computer system that receives this electronic communication from the first user responds to the email by signing the verification data nonce and sends a verification response containing the signed nonce back to the first user. The first user can then verify the signature from the signed nonce and can compare this verify signature against the signature of the original content received that was purported to originate from the same user. If the signatures compare properly, then the first user can be fairly certain (to the extent they trust that the originator of the content has access to the inbox specified by the certificate) that the original content is actually from the purported identity.

In one configuration, the system includes a computer system executing an identity verifying process. The identity verifying process receives content purporting to originate from a content sender, and performs a validation of the content. In an example configuration, the identity verifying process validates a signed certificate associated with the content to obtain an electronic communication from the certificate as the purported identity of the content sender. The purpose of validating the content is to determine a purported identity of the content sender. The identity verifying process then prepares and transfers verification data to an address associated with the purported identity of the content sender. In an example configuration, the identity verifying process transfers the verification data to the electronic communication from the certificate. The verification data contains a request that a recipient of the verification data return a signed copy of the verification data in the verification response. In response to transferring the verification data, the identity verifying process receives a verification response to the verification data. The identity verifying process then performs a validation of the verification response to verify the purported identity of the content sender. In an example configuration, the identity verifying process authenticates the purported identity of the content origination by comparing a signature of the signed copy of the verification data to a signature of the signed certificate associated with the content.

During an example operation of one embodiment, suppose a first user, working in a company that has not implemented public key infrastructure (PKI), receives an email from a second user. The email contains a signed certificate indicating that the email originated from the second user. The first user validates the signature that covers the message within the email. If this signature validates properly, then the first user may try to extract an electronic communication from the certificate. The signed certificate may or may not have actually been generated by the true identity of the second user (i.e. by a process being operated by this person). As is known in the art, email spoofing is widely used to change the "From:" line of an email message to any content a sender wishes the receiving user to see. Likewise, a malicious user can generate a certificate of their own the purports to be from the identity of another user. Accordingly, the content in the email that the first user receives that purports to be from the second user may or may not actually be from that second user. The system disclosed herein allows the first user to make a decision as to the trustiness of this purported identity without access to public key infrastructure.

To do so, the first user, utilizing the identity verifying process disclosed herein (either by manually invoking the identity verifying process, or via an automated process that invokes the identity verifying process each time an email arrives containing a signed certificate), validates the signed message (and the certificate to verify that signature) within the email sent by the second user. In performing the validation of the signed certificate, an electronic communication, purportedly from the second user, is obtained from the signed certificate. The identity verifying process prepares a nonce, and then transmits the nonce to the second user by sending the nonce to the electronic communication obtained from the signed certificate. Generally, a nonce is non-recurring randomly generated data. Note that not all embodiments disclosed herein required generation of a nonce as verification data, and other verification data can be used as will be explained herein. The identity verifying process receives, in return, the nonce signed by the second user. The identity verifying process performs a validation of the signed nonce by authenticating the identity of the second user. The authentication is performed by validating the signature covering the signed nonce (received from the second user) using the public key obtained from the certificate that was sent in the original message. If the signatures are the same, the first user can be fairly certain that the content actually did originate from the second user. In this manner, the first user does not require access to any certificate authority, but relies on the trustiness of outbound email, sent from the first user to the second user (as opposed to the trustiness of incoming email), to properly reach the true second user for validation purposes. Further details of other embodiments of this processing will be explained in more detail below.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by Adobe Systems, Inc. of San Jose, Calif.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 4 illustrates a flowchart of a procedure performed by the identity verifying process when it prepares and transfers verification data to an address associated with the purported identity of the content sender, according to one embodiment disclosed herein.

FIG. 5 illustrates a flowchart of a procedure performed by the identity verifying process when it performs a validation of the verification response to verify the purported identity of the content sender, according to one embodiment disclosed herein.

DETAILED DESCRIPTION

Embodiments disclosed herein include methods and a computer system that includes a computer system executing an identity verifying process. The identity verifying process receives content purporting to originate from a content sender, and performs a validation of the content. In an example configuration, the identity verifying process validates a signed certificate associated with the content to obtain an electronic communication from the certificate as the purported identity of the content sender. The purpose of validating the content is to determine a purported identity of the content sender. The identity verifying process then prepares and transfers verification data to an address associated with the purported identity of the content sender. In an example configuration, the identity verifying process transfers the verification data to the electronic communication from the certificate. The verification data contains a request that a recipient of the verification data return a signed copy of the verification data in the verification response. In response to transferring the verification data, the identity verifying process receives a verification response to the verification data. The identity verifying process then performs a validation of the verification response to verify the purported identity of the content sender. In an example configuration, the identity verifying process authenticates the purported identity of the content origination by comparing a signature of the signed copy of the verification data to a signature of the signed certificate associated with the content.

Figure 1:
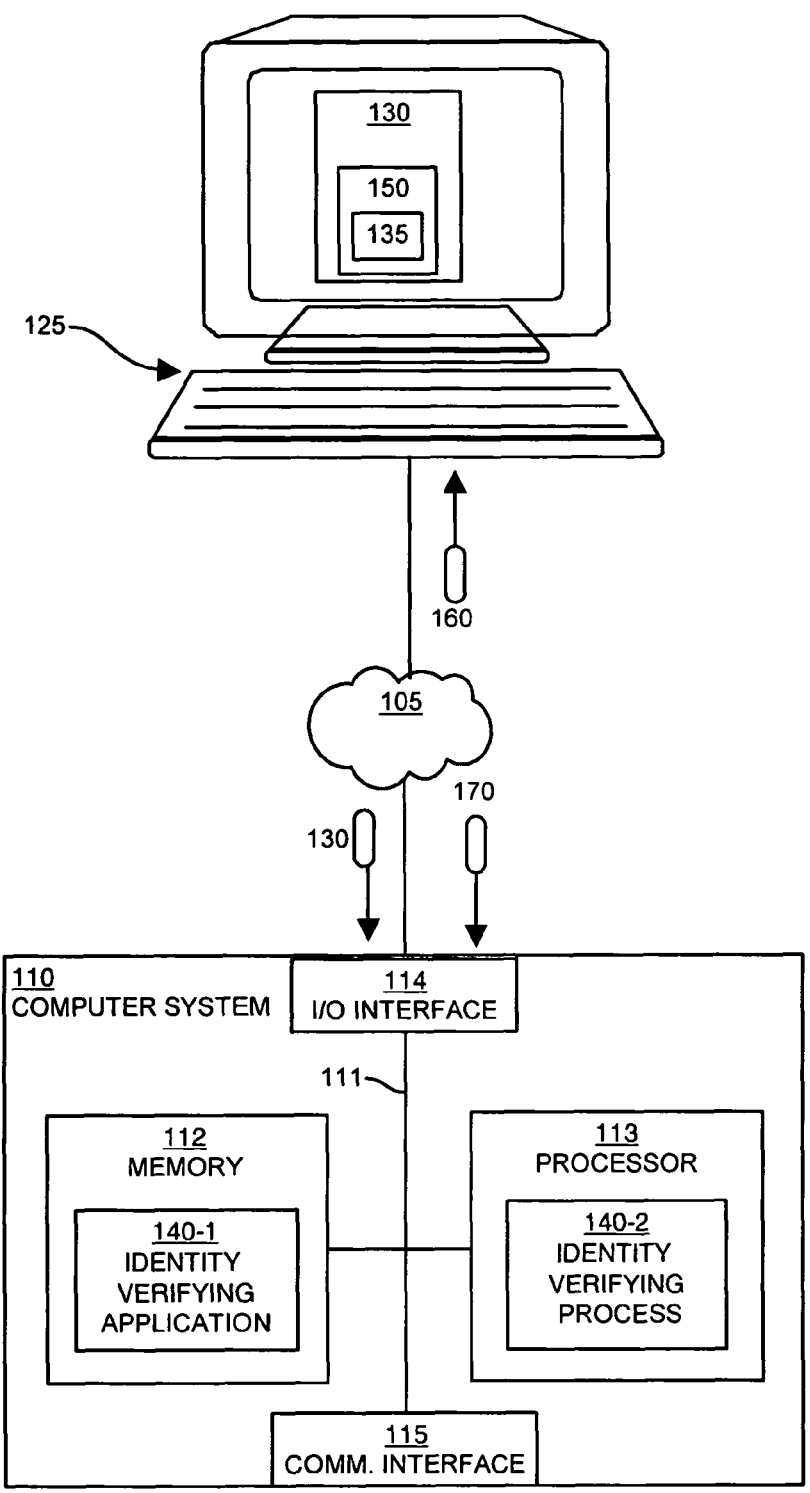
FIG. 1 shows a high-level block diagram of a computer system according to one embodiment disclosed herein.

FIG. 1 is a block diagram illustrating example architecture of a computer system 110 that executes, runs, interprets, operates or otherwise performs an identity verifying application 140-1 and identity verifying process 140-2, for use in explaining example configurations disclosed herein. The computer system 110 may be any type of computerized device such as a personal computer, workstation, portable computing device, console, laptop, network terminal or the like. The content sender 125 contains content 130 containing a certificate 150. The certificate contains an address 135 associated with the content sender 125. The identity verifying process 140-2 receives content 130 from the content sender 125, via a local area network (LAN) 105, and prepares and transmits verification data 160 back to the content sender 125. In response, the identity verifying process 140-2 receives a verification response 170. As shown in this example, the computer system 110 includes an interconnection mechanism 111 such as a data bus or other circuitry that couples a memory system 112, a processor 113, an input/output interface 114, and a communications interface 115. The communications interface 115 enables the computer system 110 to communicate with other devices (i.e., other computers) on a network (LAN) 105.

The memory system 112 is any type of computer readable medium, and in this example, is encoded with an identity verifying application 140-1 as explained herein. The identity verifying application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the identity verifying application 140-1. Execution of identity verifying application 140-1 in this manner produces processing functionality in an identity verifying process 140-2. In other words, the identity verifying process 140-2 represents one or more portions or runtime instances of the identity verifying application 140-1 (or the entire identity verifying application 140-1) performing or executing within or upon the processor 113 in the computerized device 110 at runtime.

It is noted that example configurations disclosed herein include the identity verifying application 140-1 (i.e., in the form of un-executed or non-performing logic instructions and/or data). The identity verifying application 140-1 may be stored on a computer readable medium (such as a floppy disk), hard disk, electronic, magnetic, optical, or other computer readable medium. The identity verifying application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the identity verifying application 140-1 in the processor 113 as the identity verifying process 140-2. Those skilled in the art will understand that the computer system 110 may include other processes and/or software and hardware components, such as an operating system not shown in this example.

Further details of configurations explained herein will now be provided with respect to a flow chart of processing steps that show the high level operations disclosed herein to perform the identity verifying process 140-2.

Figure 2:
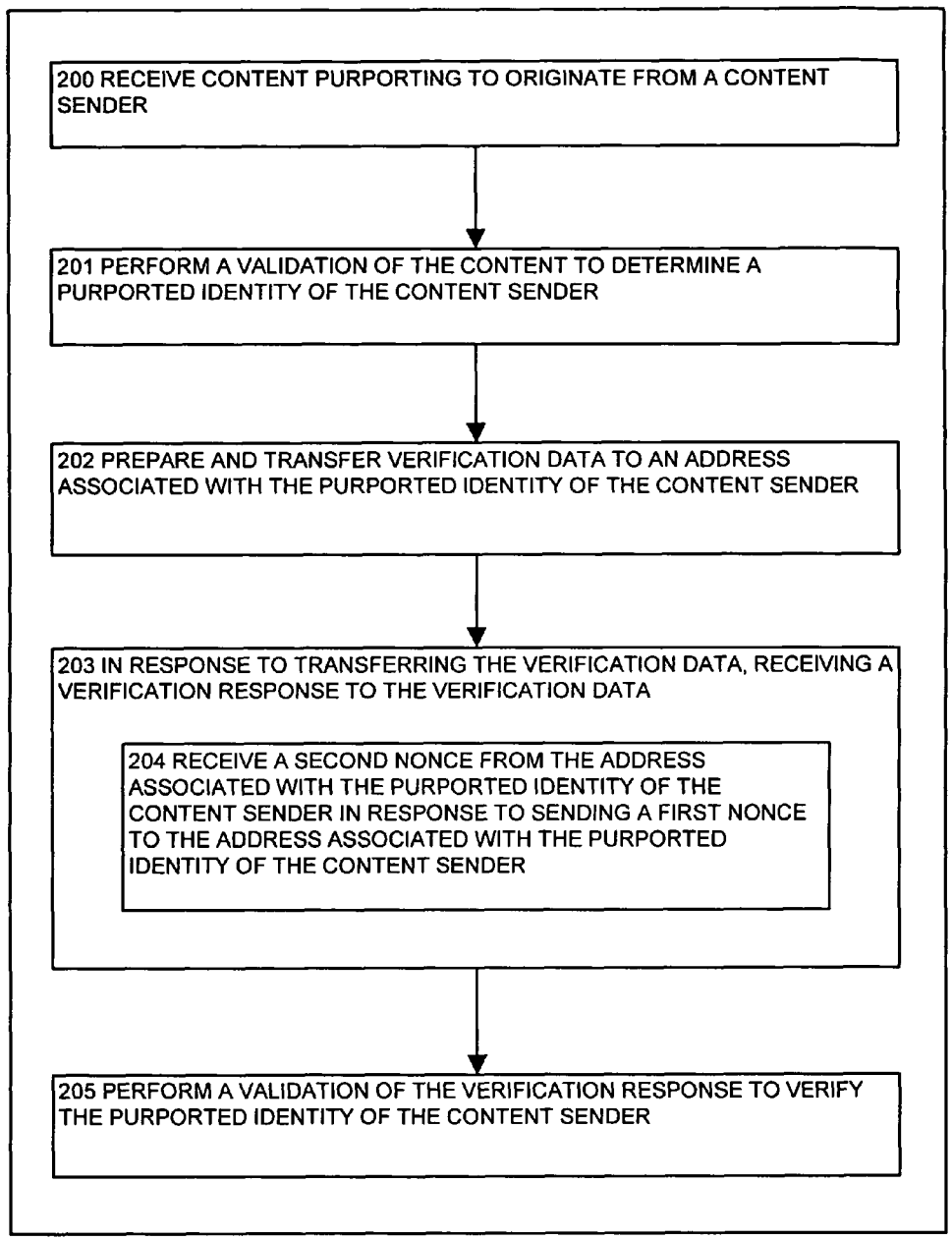
FIG. 2 illustrates a flowchart of a procedure performed by the identity verifying process when it receives content purporting to originate from a content sender, according to one embodiment disclosed herein.

FIG. 2 is a flowchart of the steps performed by the identity verifying process 140-2 when it receives content 130 purporting to originate from a content sender 125, and sends a verification data 160 to validate the purported identity of the content sender 125.

In step 200, the identity verifying process 140-2 receives content 130 purporting to originate from a content sender 125. For example, a first user receives an email from a second user. The email contains a signed certificate supposedly from the second user.

In step 201, the identity verifying process 140-2 performs a validation of the content 130 to determine a purported identity of the content sender 125. In other words, the identity verifying process 140-2 examines the content 130 to determine who supposedly sent the content 130.

In step 202, the identity verifying process 140-2 prepares verification data 160, and then transfers the verification data 160 to an address 135 associated with the purported identity of the content sender 125. During the step of examining the content 130 to determine who supposedly sent the content 130, the identity verifying process 140-2 obtains an address 135 associated with the content sender 125. The identity verifying process 140-2 transmits the verification data 160 to that address 135.

In response to transferring the verification data 160 to an address 135 associated with the content sender 125, in step 203, the identity verifying process 140-2 receives a verification response 170. The identity verifying process 140-2 receives a verification response 170 from the address 135 to which the verification data 160 was sent.

In an example configuration, the verification data 160 is a nonce (i.e., substantially non-reoccurring data), and the verification response 170 is a nonce. In step 204, the identity verifying process 140-2 receives a second nonce from the address 135 associated with the purported identity of the content sender 135 in response to sending a first nonce to the address 135 associated with the purported identity of the content sender 125. In an example configuration, the first nonce and the second nonce are the same nonce.

In step 205, the identity verifying process 140-2 performs a validation of the verification response 170 to verify the purported identity of the content sender 125. The identity verifying process 140-2 validates the verification response 170 to determine that the verification response 170 originated from the same address 135 to which the verification data 160 was transmitted, thereby verifying the identity from which the content 130 originated.

Figure 3:
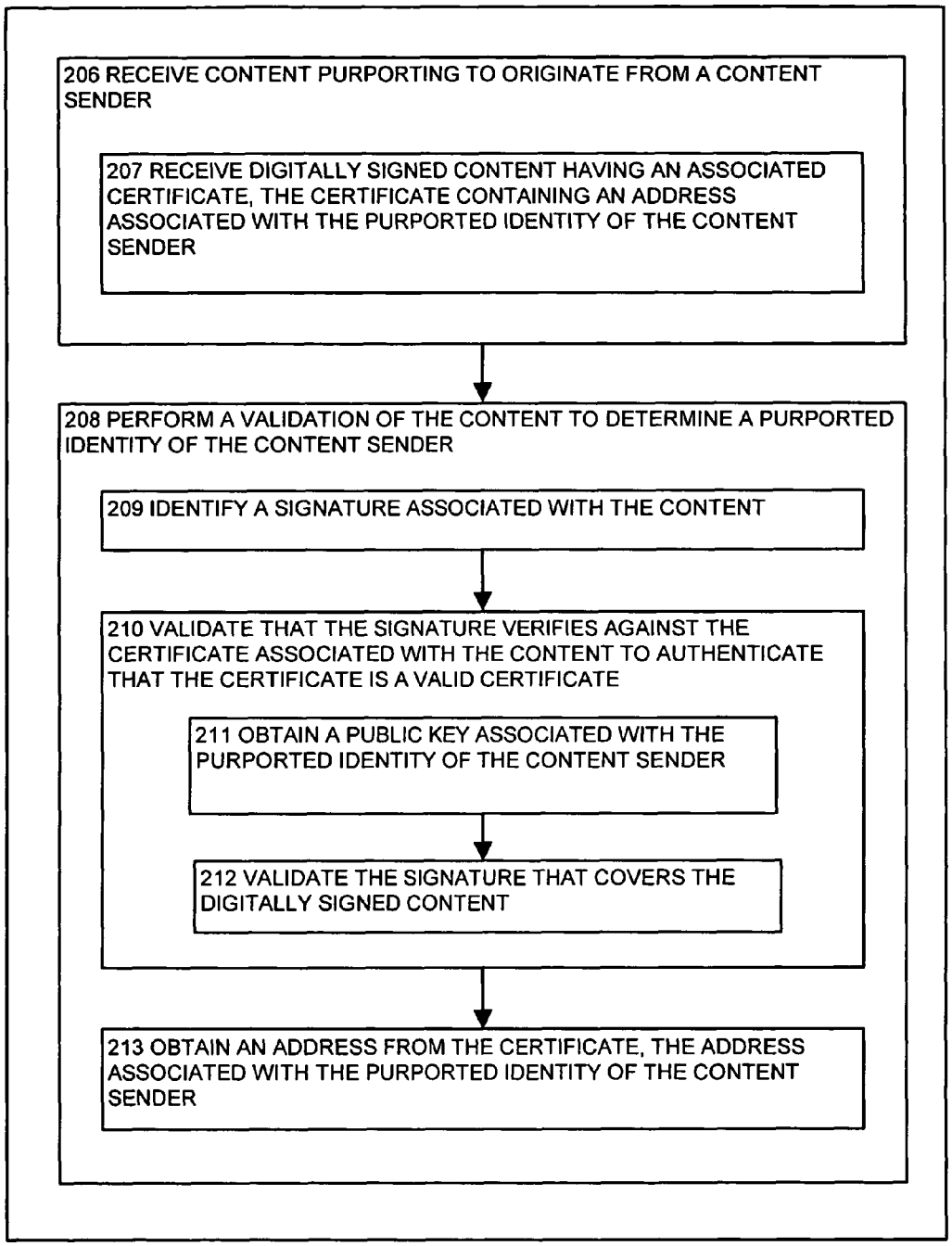
FIG. 3 illustrates a flowchart of a procedure performed by the identity verifying process when it receives content purporting to originate from a content sender, according to one embodiment disclosed herein.

FIG. 3 is a flowchart of the steps performed by the identity verifying process 140-2 when it receives content 130 purporting to originate from a content sender 125, and then performs a validation of the content 130 to determine a purported identity of the content sender 125.

In step 206, the identity verifying process 140-2 receives content 130 purporting to originate from a content sender 125. In one embodiment, the content 130 could contain an electronic certificate 150 or a digital signature.

In step 207, the identity verifying process 140-2 receives digitally signed content 130 that has an associated certificate 150. The certificate 150 contains an address 135 associated with the purported identity of the content sender 125. In one embodiment, the address is an electronic communication of the content sender 125.

In step 208, the identity verifying process 140-2 performs a validation of the content 130 to determine a purported identity of the content sender 125. For example, if the content 130 has an associated certificate 150, the identity verifying process 140-2 verifies the validity of that associated certificate 150.

In step 209, the identity verifying process 140-2 identifies a signature associated with the content 130. For example, the signature could be a digital signature associated with an email sent from the content sender 125.

In step 210, the identity verifying process 140-2 validates that the signature verifies against the certificate 150 associated with the content 130. By validating the signature against the certificate 150, the identity verifying process 140-2 authenticates that the certificate 150 is a valid certificate (i.e., not a falsified certificate attached to the content 130).

In step 211, the identity verifying process 140-2 obtains a public key associated with the purported identity of the content sender 125. To validate the certificate 150, the identity verifying process 140-2 requires a public key provided by the content sender 125.

In step 212, the identity verifying process 140-2 validates the certificate 150 using a public key to verify that the signature is valid. The identity verifying process 140-2 uses the public key obtained from the content sender 125 to validate the certificate 150, verifying the signature is valid.

In step 213, the identity verifying process 140-2 obtains an address 135 from the certificate 150. During the process of validating the certificate 150 using a public key to verify that the signature is valid, an address 135 associated with the supposed content sender 125 is obtained.

FIG. 4 is a flowchart of the steps performed by the identity verifying process 140-2 when it prepares verification data 160 to be transmitted to the content sender 125. The identity verifying process 140-2 then transfers that verification data 160 to an address 135 associated with the purported identity of the content sender 125.

In step 214, the identity verifying process 140-2 prepares and transfers verification data 160 to an address 135 associated with the purported identity of the content sender 125. In one embodiment, the address 135 was obtained during the process of validating a certificate 150 associated with the content 130.

In step 215, the identity verifying process 140-2 creates verification data 160 to validate the purported identity of the content sender 125. In one embodiment, the verification data 160 is substantially non-reoccurring data.

In step 216, the identity verifying process 140-2 creates substantially non-reoccurring that is at least one of:

i) a nonce,
   ii) a timestamp,
   iii) a globally unique identifier (GUID)

In step 217, the identity verifying process 140-2 creates a signature request (that is to be sent to the electronic communication address 135 associated with the identity of the content sender 125) containing the verification data 160. The signature request also contains a request for the purported content sender 125 to sign the verification data 160.

In step 218, the identity verifying process 140-2 transmits the signature request (containing the verification data 160 and the request to sign the verification data 160) to the electronic communication 135 associated with the purported identity of the content sender 125.

In step 219, the identity verifying process 140-2 transmits the signature request to the electronic communication 135 associated with the purported identity of the content sender 125. In an example configuration, an electronic communication of the purported identity of the content sender is obtained from the certificate 150.

FIG. 4 is a flowchart of the steps performed by the identity verifying process 140-2 when it performs a validation of the verification response 170 to verify the purported identity of the content sender 125. In performing the validation of the verification response 170, the identity verifying process 140-2 confirms the identity of the content sender 125.

In step 220, the identity verifying process 140-2 performs a validation of the verification response 170 to verify the purported identity of the content sender 125. The verification response 170 was sent in response to the verification data 160 that was sent to an address 135 associated with the purported identity of the content sender 125.

In step 221, the identity verifying process 140-2 verifies that the verification response 170 was returned from an electronic communication 135 to which the verification data 160 was sent. The electronic communication 135 was obtained from a certificate 150 associated with the content 130 received from the content sender 125. Therefore, the identity verifying process 140-2 has confirmed the identity of the content sender 125.

Alternatively in step 222, the identity verifying process 140-2 verifies that a signature associated the verification response 170 is the same as the signature verified against the certificate 150 thereby confirming the identity of the content sender 125.

In step 223, the identity verifying process 140-2 verifies that a signature on the verification data 160 contained in the signature request, is the same as the signature verified against the certificate 150. The signature request contained the verification data 160, and a request for the purported content sender 125 to sign the verification data 160. In confirming the signature on the verification data 160 contained in the signature request is the same as the signature verified against the certificate 150, the identity verifying process 140-2 has confirmed the identity of the content sender 125.

While computer systems and methods have been particularly shown and described above with references to configurations thereof, it will be understood by those skilled in the art that various changes in form and details may be made therein without departing from the scope disclosed herein. Accordingly, embodiments disclosed herein are not intended to be limited by the example configurations provided above.

What is claimed is:

1. A method comprising:
   receiving, at a destination computerized device, content comprising a first electronic signature and an electronic address, wherein the electronic address in the content identifies that the content was sent from a content sender associated with the electronic address, wherein the electronic address is used in delivering electronic messages to the content sender;

sending a request, from the destination computerized device to the electronic address of the content sender, that a second electronic signature be applied to verification data, wherein the request comprises the verification data;

receiving, at the destination computerized device, a response comprising the second electronic signature; and comparing, via the destination computerized device, the first electronic signature to the second electronic signature to confirm that the content was sent from the content sender associated with the electronic address.

2. The method of claim 1 wherein the content comprises a certificate, wherein the certificate comprises the first electronic signature and the electronic address.

3. The method of claim 2 wherein the certificate further comprises a public key for decrypting the first electronic signature.

4. The method of claim 2 wherein the electronic address is obtained from the certificate upon validating the certificate with a public key.

5. The method of claim 1 further comprising verifying that the electronic address to which the request was sent is the same as the electronic address from which the response was received to validate that the content was sent from the content sender associated with the electronic address identified in the content.

6. The method of claim 1 wherein the verification data comprises a first nonce and the response comprises a second nonce.

7. The method of claim 1 wherein the verification data is generated at the destination computerized device, the verification data comprising at least one of a nonce, a timestamp, or a globally unique identifier.

8. A method comprising:

receiving, at a destination computerized device, content comprising a first electronic signature and an electronic address, wherein the electronic address in the content identifies that the content was sent from an electronic account associated with the electronic address, wherein the electronic address is used in delivering electronic messages to the electronic account;

sending a request, from the destination computerized device to the electronic address associated with the electronic account, that a second electronic signature be applied to verification data, wherein the request comprises the verification data;

receiving, at the destination computerized device, a response comprising the second electronic signature; and comparing, via the destination computerized device, the first electronic signature to the second electronic signature to confirm that the content was sent from the electronic account associated with the electronic address.

9. The method of claim 8 wherein the content comprises a certificate, wherein the certificate comprises the first electronic signature and the electronic address.

10. The method of claim 9 wherein the certificate further comprises a public key for decrypting the first electronic signature.

11. The method of claim 8 further comprising verifying that the electronic address to which the request was sent is the same as the electronic address from which the response was received to validate that the content was sent from the electronic account associated with the electronic address identified in the content.

12. The method of claim 8 wherein the verification data comprises a first nonce and the response comprises a second nonce.

13. A non-transitory computer readable storage medium encoded with computer programming logic that when executed on a processor in a computerized device produces an identity verifying application that verifies an identity of a content sender by causing the computerized device to perform the operations comprising:

receiving, at a destination computerized device, content comprising a first electronic signature and an electronic address, wherein the electronic address in the content identifies that the content was sent from the content sender associated with the electronic address, wherein the electronic address is used in delivering electronic messages to the content sender;

sending a request, from the destination computerized device to the electronic address of the content sender, that a second electronic signature be applied to verification data, wherein the request comprises the verification data;

receiving, at the destination computerized device, a response comprising the second electronic signature; and comparing, via the destination computerized device, the first electronic signature to the second electronic signature to confirm that the content was sent from the content sender associated with the electronic address.

14. The non-transitory computer readable storage medium of claim 13 wherein the content comprises a certificate, wherein the certificate comprises the first electronic signature and the electronic address.

15. The non-transitory computer readable storage medium of claim 14 wherein the certificate further comprises a public key for decrypting the first electronic signature.

16. The non-transitory computer readable storage medium of claim 13 further comprising verifying that the electronic address to which the request was sent is the same as the electronic address from which the response was received to validate that the content was sent from the content sender associated with the electronic address identified in the content.

17. The non-transitory computer readable storage medium of claim 13 wherein the verification data comprises a first nonce and the response comprises a second nonce.

18. A non-transitory computer readable storage medium encoded with computer programming logic that when executed on a processor in a computerized device produces an identity verifying application that verifies an identity of an electronic account by causing the computerized device to perform the operations comprising:

receiving, at a destination computerized device, content comprising a first electronic signature and an electronic address, wherein the electronic address in the content identifies that the content was sent from the electronic account associated with the electronic address, wherein the electronic address is used in delivering electronic messages to the electronic account;

sending a request, from the destination computerized device to the electronic address associated with the electronic account, that a second electronic signature be applied to verification data, wherein the request comprises the verification data;

receiving, at the destination computerized device, a response comprising the second electronic signature; and comparing, via the destination computerized device, the first electronic signature to the second electronic signature to confirm that the content was sent from the electronic account associated with the electronic address.

19. The non-transitory computer readable storage medium of claim 18 wherein the content comprises a certificate, wherein the certificate comprises the first electronic signature and the electronic address.

20. The non-transitory computer readable storage medium of claim 19 wherein the certificate further comprises a public key for decrypting the first electronic signature.

21. The non-transitory computer readable storage medium of claim 18 further comprising verifying that the electronic address to which the request was sent is the same as the electronic address from which the response was received to validate that the content was sent from the electronic account associated with the electronic address identified in the content.

22. The non-transitory computer readable storage medium of claim 18 wherein the verification data comprises a first nonce and the response comprises a second nonce.

* * * * *